United States Patent [19]
Matsuzaki et al.

[11] Patent Number: 5,217,668
[45] Date of Patent: Jun. 8, 1993

[54] METHOD FOR PRODUCING A RUBBER STOPPER FOR A VIAL

[75] Inventors: Masaru Matsuzaki, Odate; Yoshihide Aoki, Suita, both of Japan

[73] Assignee: Nissho Corporation, Osaka, Japan

[21] Appl. No.: 691,058

[22] PCT Filed: Oct. 20, 1990

[86] PCT No.: PCT/JP90/13559
§ 371 Date: Jul. 29, 1991
§ 102(e) Date: Jul. 29, 1991

[87] PCT Pub. No.: WO91/05649
PCT Pub. Date: May 2, 1991

[30] Foreign Application Priority Data
Oct. 23, 1989 [JP] Japan .................. 1-275580

[51] Int. Cl.⁵ .................. B29C 43/14; B29C 43/18
[52] U.S. Cl. .................. 264/161; 264/241; 264/250; 264/255
[58] Field of Search .................. 204/161; 264/134, 135, 264/241, 250, 255, 259, 266; 215/247, 364

[56] References Cited
U.S. PATENT DOCUMENTS

| | | | |
|---|---|---|---|
| 4,397,903 | 8/1983 | Allen et al. | 428/156 |
| 4,915,243 | 4/1990 | Tatsumi et al. | 215/247 |
| 5,078,941 | 1/1992 | Tatsumi et al. | 264/250 |

FOREIGN PATENT DOCUMENTS
54-9119  4/1979  Japan .
57-47636  3/1982  Japan .
57-53184  11/1982  Japan .

*Primary Examiner*—Jay H. Woo
*Assistant Examiner*—James P. Mackey
*Attorney, Agent, or Firm*—Armstrong, Westerman, Hattori, McLeland & Naughton

[57] ABSTRACT

A method for producing a rubber stopper for a vial, a leg portion side of which is covered with a synthetic resin film. The producing method comprises (i) a primary forming step of piling a synthetic resin film 1 resistant to medicines or medical chemicals onto an unvulcanized rubber sheet 2, and forming by pressing and heating them between the molds (A, B), (ii) a secondary forming step of covering the primary formed article from the leg side of the primary formed article with a half-vulcanized rubber sheet having a hole 10 of which diameter is the same as that of a root portion of the leg portion 4 of the primary formed article and forming by pressing and heating it by means of a pair of molds, and (iii) a step of cutting and removing a flash around the resulting secondary formed article. A rubber stopper and a synthetic resin sheet being laminated can be formed at one time. Further, since the synthetic resin sheet can be treated in the condition that the sheet is linked, the method is particularly effective for producing multiple rubber stoppers for a vial.

2 Claims, 1 Drawing Sheet

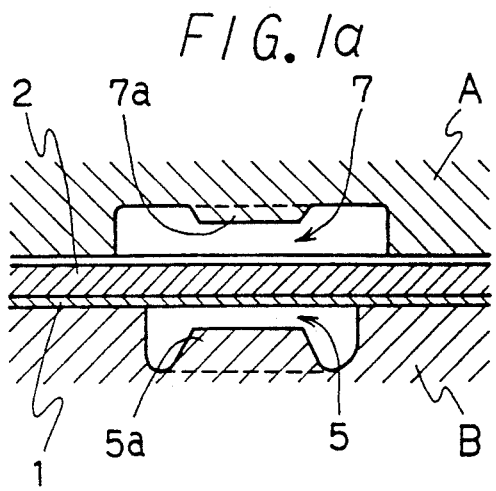
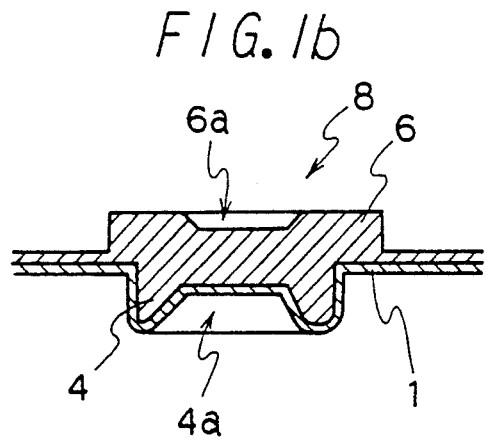
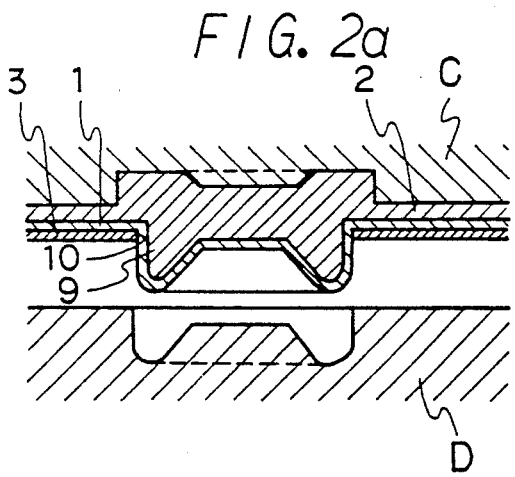
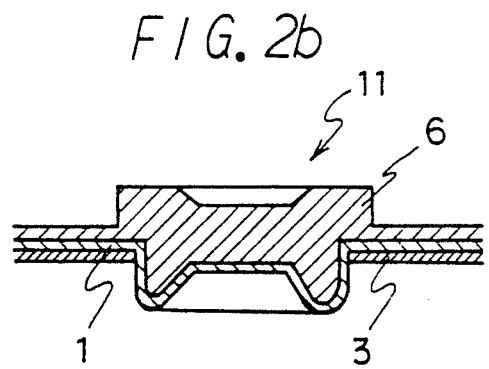
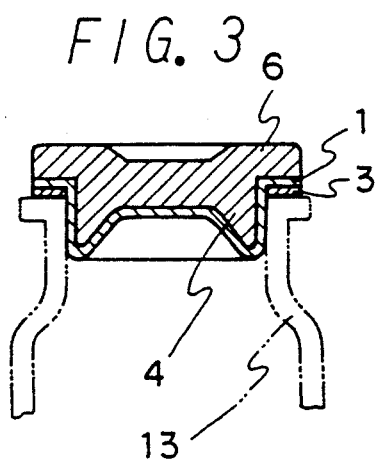
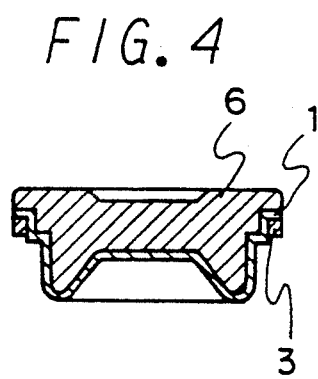
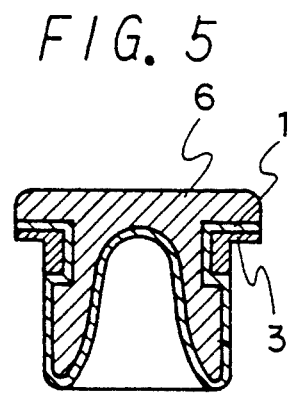

METHOD FOR PRODUCING A RUBBER STOPPER FOR A VIAL

DESCRIPTION

1. Technical Field

The present invention relates to a method for producing a rubber stopper for a vial, and more particularly to a method for producing a rubber stopper for a vessel for medicine, which is covered with a synthetic resin film.

2. Background Art

Generally, medicine in a vial is badly affected by a stopper which is used for a vessel for medicine, where a vulcanization-accelerator and other compounded ingredients contained in the rubber stopper exude in a liquid medicine in the vial, and ingredients contained in the liquid medicine are adsorbed to the rubber.

In order to prevent the rubber from affecting the liquid medicine in the vial, a rubber stopper of which surface being contacted with a liquid medicine is laminated with a synthetic resin film having a chemical resistance has conventionally been sometimes used as disclosed in Japanese Examined Patent Publication No. 9119/1979, Japanese Unexamined Patent Publication No. 47637/1982 and so on.

Several methods for producing such a covered rubber stopper have been proposed.

For instance, as disclosed in the above-mentioned Japanese Examined Patent Publication No. 9119/1979, there is a method wherein a fluorocarbon resin film is formed and cut so as to give a shape corresponding to the shape of a leg portion of a rubber stopper, a mold for forming a rubber stopper is charged with the formed film having a shape corresponding to the shape of the leg portion, moreover a rubber material is poured into the mold, and a rubber stopper is produced by forming and vulcanization.

As disclosed in Japanese Examined Patent Publication No. 53184/1982, there is a method wherein a leg portion made of a rubber which is covered with a synthetic resin film is formed and cut, then inserted into the other mold, and the top surface is integratedly formed and bonded with the upper part of the leg portion.

However, in these methods, it is necessary that firstly a formed article of a resin film having a shape corresponding to the shape of the leg portion of the rubber stopper is formed or the leg portion made of a rubber which is covered with a film is formed, then cut to pieces one by one, and moreover these pieces are inserted into a mold for forming a final product. Therefore, there is a problem that the process for producing a covered rubber stopper is complicated as a whole.

The present invention provides a method for producing these covered rubber stoppers more efficiently and economically.

DISCLOSURE OF THE INVENTION

In accordance with the present invention, there is provided a method for producing a rubber stopper for a vial comprising:

(i) a primary forming step for obtaining a primary formed article by piling a synthetic resin film resistant to medicines or medical chemicals onto an unvulcanized rubber sheet, and pressing and heating them by means of molds comprising a first mold having a cavity being adapted to the shape of a leg portion of a rubber stopper and a second mold having a cavity being adapted to the shape of a head portion of the rubber stopper, (ii) a secondary forming step for obtaining a secondary formed article by covering the primary formed article with a half-vulcanized rubber sheet having a hole of which diameter is the same as that of a root portion of the leg portion of the primary formed article or a little more larger than that of the root portion, and pressing and heating it by means of a pair of molds being adapted to the shape of the final product to give a secondary formed article of which under face of a head portion or portion except for the leg portion is covered with a rubber layer, and (iii) a cutting process for cutting and removing a flash from the secondary formed article.

As a material of the synthetic resin film resistant to a medicine or a ethical drug, which is used in the method of the present invention, fluorocarbon resin, nylon, polyethylene, polypropylene and the like are given, and these materials are suitably selected in accordance with chemicals which are contained in a vial. It is necessary that these films have an adhesion property to the rubber based upon the vulcanization. As occasion demands, in order to improve the adhesive property, a treatment such as a chemical treatment, a corona discharge treatment or a sputter-etching treatment can be carried out.

As a material of the rubber stopper, a synthetic rubber such as butyl rubber, halogenated butyl rubber, butadiene rubber, isoprene rubber, ethylene-propylene rubber or silicone rubber or natural rubber is used. A compounding ingredient for a rubber is usually contained in the material of the rubber.

In the method of the present invention, in order to obtain a primary formed article, when the synthetic resin film is piled on an unvulcanized rubber sheet and they are pressed and heated by means of a mold, at the same time the vulcanization is performed, the shape of the rubber stopper which is covered with a film is formed.

It is preferable to carry out the pressing and heating in its step so that complete vulcanization can be avoided in consideration of being re-heated in the step for producing a secondary formed article.

In the step for producing a secondary formed article, a half-vulcanized rubber sheet finally prevents the synthetic resin sheet from peeling off, and plays a part in sealing or packing when the rubber stopper is used in the vial 13 as shown by a phantom line in FIG. 3. The reason why not an unvulcanized rubber but a half-vulcanized rubber is used in such a rubber sheet is that flowing into the portion of the synthetic resin film is avoided during vulcanization and thereby the surface of the film is prevented from pollution. The degree of vulcanization for the half-vulcanized rubber is suitably decided by the components of the rubber, temperature for vulcanizing in a secondary forming step and the like.

Also, the reason for pressing and heating in this step is to obtain a rigid completed secondary formed article by covering and bonding the lower face of the head portion or the whole surface except the leg portion with a rubber layer and completing the vulcanization of the whole rubber.

Further, the step for cutting down a flash from a secondary formed article (or for cutting down a completed product from a sheet-like flash) is generally employed in case of manufacturing rubber products from a sheet-like rubber material.

Hereinafter, the method of the present invention is concretely explained by examples.

BRIEF DESCRIPTION OF THE DRAWINGS

FIG. 1a is a sectional view showing an embodiment of the primary forming step in the method of the present invention;

FIG. 1b is a sectional view showing the primary formed article obtained in the primary forming step of FIG. 1a;

FIG. 2a is a sectional view showing an embodiment of the secondary forming step in the method of the present invention; and FIG. 2b is a sectional view showing a secondary formed article obtained in the secondary forming step; and FIG. 3, FIG. 4 and FIG. 5 are longitudinal sectional views showing embodiments of a rubber stopper for a vial obtained by the producing method of the present invention.

BEST MODE FOR CARRYING OUT THE INVENTION

As shown in FIG. 1a, a first mold B which is a lower side mold of a set of molds for the primary forming has a cavity 5 somewhat deeper than a real size of the leg portion (4 in FIG. 3) of the final product, and an upper side second mold A has a cavity 7 which is somewhat shallower than a real size of the head portion (6 in FIG. 3) of the final product. Each cavity 5, 7 is provided with a projection 5a, 7a corresponding to the respective recess (4a, 6a in FIG. 1b) to be formed at the center of a product in order to improve forming accuracy. A laminate of a synthetic resin film 1 and an unvulcanized rubber sheet 2 is put between the molds A and B, and forming, vulcanizing and adhesion by crosslinking are carried out by pressing and heating.

By the above-mentioned steps, primary formed articles 8 which are still linked with each other through a sheet-like flash which is formed by melting the periphery part of a product once and then re-forming it. The primary formed article has a body of the rubber stopper covered with a synthetic resin material at the lower side (at the leg side) thereof. Though conditions of pressing and heating during the primary forming step are changed in accordance with the kind of the used synthetic resin film and rubber, the kind of compounding ingredients, thickness thereof, size of molds and the like, the conditions are usually 130° to 180° C., 50 to 300 kg/cm² and 5 to 15 minutes. However, the conditions for vulcanization are adjusted so that the hardness of the primary formed article is lower than the hardness of the final product since vulcanization also proceeds when the primary formed article is re-heated in the secondary forming step.

Also, in the primary forming step, the primary formed article can be formed by pre-vulcanizing only an unvulcanized rubber sheet 2 to an extent, then opening the molds, putting a resin film therebetween, and pressing and heating again to continue the vulcanization.

Next, as shown in FIG. 2a, the under face of the head portion 6 (shown in FIG. 1b) is covered with a half-vulcanized rubber sheet 3 having holes 10 of which diameter is almost the same as that of the root portion 9 of the leg portion 4 (shown in FIG. 1b) of the rubber stopper, which is separately produced. Then, the material is pressed and heated between the second molds C and D having shapes adapted to the shape of the final product, and subsequently the body and the half-vulcanized rubber sheet are vulcanized to give a secondary formed article having a form shown in FIG. 2b. As the half-vulcanized rubber sheet 3 used in that step, a sheet of 0.5 to 2 mm in thickness can be employed which is produced by vulcanizing a rubber material composed of the same components as the primary product or a rubber material composed of such components that gives a vulcanizing rate slightly higher than the primary formed article at 130° to 180° C. for 0.5 to 5 minutes.

Finally, the obtained secondary formed articles 11 are taken out from the molds C, D, and the final products are struck off in order to remove a sheet-like flash. Thereby, such products as shown in FIG. 3 are obtained.

In the secondary forming step, each of the secondary formed articles can be formed by abutting the molds C and D with each other, and finally cutting and removing a flash around the rubber stopper.

In the method of the present invention, by properly changing the shape of a cavity of the mold, rubber stoppers for a vial having various shapes as shown in FIG. 4 and FIG. 5 can be produced. In FIGS. 3 to 5, the numerals denote the same portions as in FIG. 1a and FIG. 2a.

In the method of the present invention, the process is simple since it is not necessary to put each of the leg-shaped-film products or leg portions laminated with a film into the molds one by one, which has been employed in conventional proposed methods. Also, since both a primary formed article and a half-vulcanized sheet with holes have a sheet-like form, those can be easily treated in the process for manufacturing. For example, when a set of molds with multiple cavities is used, a lot of covered rubber stoppers can be manufactured at a time. Accordingly, the covered rubber stoppers can be efficiently and economically mass-produced.

In addition, the producing method of the present invention is indeed effective for mass-production by multiple cavities, but it can be also employed in such a case that the rubber stoppers are produced one by one.

We claim:

1. A method for producing a rubber stopper for a vial, the rubber stopper having a head portion connected through a root portion to a leg portion, comprising:
    (i) obtaining a primary formed article by piling a synthetic resin film resistant to medicines or medical chemicals onto an unvulcanized rubber sheet, and pressing and heating the synthetic resin film and the unvulcanized rubber sheet with molds comprising a first mold having a cavity in the shape of the leg portion of the rubber stopper and a second mold having a cavity in the shape of the head portion of the rubber stopper, the synthetic resin film being in contact with the first mold and the unvulcanized rubber sheet being in contact with the second mold during the pressing and heating,
    (ii) obtaining a secondary formed article by contacting the side of the primary formed article containing the root portion with a half-vulcanized rubber sheet having a hole of which diameter is one of a diameter which is the same as that of the root portion of the leg portion of the primary formed article and a diameter which is larger than that of the root portion, and pressing and heating the half-vulcanized rubber sheet and the primary formed article by means of a pair of molds in the shape of a final product to give the secondary formed article, and (iii) cutting and removing a flash from the secondary formed article.

2. A method for producing a rubber stopper for a vial, the rubber stopper having a head portion connected through a root portion to a leg portion, comprising:

(i) obtaining a primary formed article by prevulcanizing an unvulcanized rubber sheet with molds comprising a first mold having a cavity in the shape of the leg portion of the rubber stopper and a second mold having a cavity in the shape of the head portion of the rubber stopper to form a prevulcanized article, placing a synthetic resin film resistant to medicines or medical chemicals between the prevulcanized article and the first mold, and pressing and heating the prevulcanized article and the synthetic resin film with the molds to form the primary formed article, (ii) obtaining a secondary formed article by contacting the side of the primary formed article containing the root portion with a half-vulcanized rubber sheet having a hole of which diameter is one of a diameter which is the same as that of the root portion of the leg portion of the primary formed article and a diameter which is larger than that of the root portion, and pressing and heating the half-vulcanized rubber sheet and the primary formed article by means of a pair of molds in the shape of a final product to give the secondary formed article, and (iii) cutting and removing a flash from the secondary formed article.

* * * * *